US012759501B2

(12) United States Patent
Kang et al.

(10) Patent No.: US 12,759,501 B2
(45) Date of Patent: Oct. 13, 2026

(54) SEAT BELT BUCKLE DEVICE

(71) Applicant: Autoliv Development AB, Vargarda (SE)

(72) Inventors: Ju Sang Kang, Hwaseong-si (KR); Won Wha Ryoo, Hwaseong-si (KR)

(73) Assignee: Autoliv Development AB, Vargarda (SE)

(*) Notice: Subject to any disclaimer, the term of this patent is extended or adjusted under 35 U.S.C. 154(b) by 97 days.

(21) Appl. No.: 18/549,466

(22) PCT Filed: Dec. 9, 2021

(86) PCT No.: PCT/KR2021/018598

§ 371 (c)(1),
(2) Date: Sep. 7, 2023

(87) PCT Pub. No.: WO2022/191383

PCT Pub. Date: Sep. 15, 2022

(65) Prior Publication Data

US 2024/0174199 A1 May 30, 2024

(30) Foreign Application Priority Data

Mar. 12, 2021 (KR) ........................ 10-2021-0032968

(51) Int. Cl.
*B60R 22/26* (2006.01)

(52) U.S. Cl.
CPC .................................... *B60R 22/26* (2013.01)

(58) Field of Classification Search
CPC ... B60R 22/26; B60R 22/18; B60R 2022/021; B60R 2022/1806; B60R 22/22; B60R 22/28; B60R 2022/81; B60R 2022/287; B60R 16/0215; B60R 16/0222; B60Y 2306/09; E05D 11/08; E05D 11/081;
(Continued)

(56) References Cited

U.S. PATENT DOCUMENTS 5,208,944 A * 5/1993 Lu ......................... E05F 1/1215
16/340
5,251,986 A * 10/1993 Arena .................. F16C 11/045
384/208
(Continued)

FOREIGN PATENT DOCUMENTS

CN 203020261 U 6/2013
JP 2010-100146 A 5/2010
(Continued)

*Primary Examiner* — Jason W San
*Assistant Examiner* — Rowland Do
(74) *Attorney, Agent, or Firm* — DICKINSON WRIGHT PLLC

(57) ABSTRACT

A seat belt buckle device includes a buckle to which a tongue is detachably coupled, a strap coupled to the lower part of the buckle and mounted at a seat frame so as to be rotatable in the forward and backward directions, a bracket which is disposed at one side of the strap and fixed to the seat frame, and which restricts the rotational angle of the strap, and a torsion spring for providing restoring force so that the strap is disposed upwards, and thus the buckle can be maintained in an erected state. Accordingly, the tongue can be easily coupled to the seat belt buckle, and noise and damage generated during the rotation of the strap connected to the buckle can be prevented.

8 Claims, 6 Drawing Sheets

(58) Field of Classification Search
CPC .... E05D 11/084; E05D 11/087; F16B 5/0258; F16L 4/10; H01B 17/58; H02G 3/083
USPC .................................................... 16/2.1–2.5
See application file for complete search history.

(56) References Cited

U.S. PATENT DOCUMENTS

| | | | | | |
|---|---|---|---|---|---|
| 5,332,261 | A * | 7/1994 | Siepierski | B60R 22/22 | 280/801.1 |
| 5,855,047 | A * | 1/1999 | Haas | B60R 22/22 | 280/801.1 |
| 6,018,847 | A * | 2/2000 | Lu | F16M 11/10 | 16/337 |
| 6,755,571 | B2 * | 6/2004 | Kajiyama | B60N 2/0705 | 384/276 |
| 7,178,876 | B2 * | 2/2007 | Borgward | B60R 22/18 | 280/801.1 |
| 7,364,200 | B2 * | 4/2008 | Downey | B60R 22/1951 | 280/801.1 |
| 7,497,474 | B2 * | 3/2009 | Sanchez | B60R 22/18 | 280/801.1 |
| 8,459,748 | B2 * | 6/2013 | Jovicevic | B60R 22/26 | 297/331 |
| 10,173,636 | B2 * | 1/2019 | Wang | B60R 22/18 | |
| 2002/0050707 | A1 * | 5/2002 | Nishide | B60R 22/22 | 280/801.1 |
| 2005/0077718 | A1 * | 4/2005 | Desmarais | B60R 22/24 | 280/808 |
| 2006/0255647 | A1 * | 11/2006 | Hyatt | B60R 22/22 | 297/468 |
| 2006/0291758 | A1 * | 12/2006 | Hong | H02K 5/163 | 384/107 |
| 2007/0164596 | A1 * | 7/2007 | Di Grande | B60R 22/02 | 297/481 |
| 2007/0222272 | A1 * | 9/2007 | Taylor | B60R 22/26 | 297/468 |
| 2012/0195679 | A1 * | 8/2012 | Tanaka | F16D 1/0835 | 403/273 |
| 2017/0144538 | A1 * | 5/2017 | Roberts | B60K 17/24 | |
| 2019/0351867 | A1 * | 11/2019 | Storck | B60R 22/18 | |
| 2022/0266725 | A1 * | 8/2022 | Hu | B60N 2/0745 | |

FOREIGN PATENT DOCUMENTS

| | | | |
|---|---|---|---|
| JP | 2011-031847 | A | 2/2011 |
| KR | 10-2013-0024063 | A | 3/2013 |
| KR | 10-2013-0034809 | A | 4/2013 |
| KR | 10-1755993 | B1 | 7/2017 |
| KR | 10-1758804 | B1 | 7/2017 |
| KR | 10-2043097 | B1 | 11/2019 |

* cited by examiner

SEAT BELT BUCKLE DEVICE

CROSS-REFERENCE TO RELATED APPLICATIONS

This application is a 35 U.S.C. § 371 national phase of PCT International Application No. PCT/KR2021/018598, filed Dec. 9, 2021, which claims the benefit of priority under 35 U.S.C. § 119 to Republic of Korea Patent Application No. 10-2021-0032968, filed Mar. 12, 2021, the contents of which are incorporated herein by reference in its entirety.

FIELD

The disclosure relates to a seat belt buckle device, and more particularly, to a seat belt buckle device which is installed to maintain a seat belt buckle in a upwardly erected state in a vehicle body.

BACKGROUND

In general, a vehicle is provided with a seat belt device on a vehicle seat to ensure driving safety of an occupant.

The seat belt device installed in the vehicle is configured to prevent an occupant from being bounced to the outside while preventing a secondary collision and mitigating an impact by restraining occupant's body upon a vehicle collision.

The most common type of such a seat belt device is a three-point type seat belt device that combines a shoulder-restraining shoulder belt and a waist-restraining lap belt.

The seat belt device may include a seat belt webbing that is woven in the form of a strap with a synthetic fiber such as nylon, polyester, etc., a retractor that stores the webbing when the seat belt is not in use or when the length of the webbing is adjusted according to a sitting posture of the occupant, a buckle and a tongue plate for mounting or releasing the webbing, and a webbing guide for fixing one end of the webbing to a vehicle body.

The applicant of the present application has filed applications for patent by disclosing seat belt device and seat belt buckle device technologies as in patent document 1 and patent document 2 presented below, and has received registration of patents.

For example, FIG. 1 is a perspective view of a related-art seat belt buckle device.

FIG. 1 illustrates a seat belt buckle device installed at both rear seats of a vehicle.

In the related-art seat belt buckle device applied to both rear seats of a vehicle, a buckle 1 is installed at a seat frame by using a strap 2 of a metallic material, which is different from a rear middle seat where a buckle is installed at a seat frame by using a webbing.

That is, as shown in FIG. 1, in the related-art seat belt buckle device applied to both rear seats of the vehicle, a base bracket 3 is installed at the seat frame, and a rivet 4 is installed by passing through the strap 2 connected with the buckle 1 and one sidewall of the base bracket 3.

Herein, the buckle 1 and the strap 2 are installed to be maintained in an upwardly erected state or a tilted state from the top to the front by a predetermined angle, so that, when a user couples the tongue (not shown) to the buckle, the user does not need to find the buckle 1 which hangs down to a lower side of the seat.

To achieve this, a torsion spring 5 is installed on the rivet 4 to provide a restoring force to the strap 2. In addition, a bracket 6 may be disposed at one side of the strap 2 to restrict a rotation angle of the strap in the forward and backward directions.

However, the related-art seat belt buckle device has a problem that a noise is generated due to contact between the strap 2 and the bracket 6 while the strap 2 is rotating about the rivet 4 in the forward and backward directions.

In addition, there is a problem that surfaces of the strap 2 and the bracket 6 are damaged and a scratch is made due to a friction generated at a contact portion between the strap 2 and the bracket 6.

In addition, in the related-art seat belt buckle device, the strap 2 may move in the horizontal direction due to the presence of a gap between the strap 2 and the bracket 6, and accordingly, in order to prevent this, a size and stiffness of the bracket 3 should increase, and hence, there is a limit to reducing the size of the bracket 6.

Meanwhile, in the related-art seat belt buckle device, the separate base bracket 3 is installed at the seat frame, and the strap 2 is installed on the base bracket 3 by using the rivet 4.

As described above, the related-art seat belt buckle device should go through a process of installing the base bracket 3 at the seat frame, and a process of installing the strap 2 on the base bracket 6 by using the rivet 4, and accordingly, there are problems that workability is degraded due to an increased number of components and processes, and a manufacturing cost unnecessarily increases.

(Patent Document 1) Korean Patent Registration No. 10-1758804 (published on Jul. 18, 2017)

(Patent Document 2) Korean Patent Registration No. 10-2043097 (published on Nov. 12, 2019)

SUMMARY

An object of the disclosure is to solve the above-described problems, and to provide a seat belt buckle device which maintains a buckle in an erected state so as to easily couple a tongue to a seat belt buckle.

Another object of the disclosure is to provide a seat belt buckle device which can prevent a noise and a damage caused by movement of a strap connected to a buckle.

Still another object of the disclosure is to provide a seat belt buckle device which can enhance workability by reducing the number of components and processes by directly installing a strap at a seat frame.

To achieve the above-described objects, a seat belt buckle device according to the disclosure may include: a buckle to which a tongue is detachably coupled; a strap which is coupled to a lower part of the buckle and is mounted at a seat frame so as to be rotatable in forward and backward directions; a bracket which is disposed at one side of the strap and fixed to the seat frame, and is configured to restrict a rotation angle of the strap; and a torsion spring configured to provide a restoring force to allow the strap to be disposed upwards.

According to the seat belt buckle device according to the disclosure as described above, the buckle can be maintained in an erected state, so that a tongue can be easily coupled to the seat belt buckle, and a noise and a damage caused during rotation of the strap connected to the buckle can be prevented.

In addition, according to the disclosure, workability can be enhanced by reducing the number of components and processes by directly installing the strap at a vehicle frame, and the manufacturing cost can be reduced.

DETAILED DESCRIPTION

Hereinafter, a seat belt buckle device according to a preferred embodiment of the disclosure will be described in detail with reference to the accompanying drawings.

Figure 1:
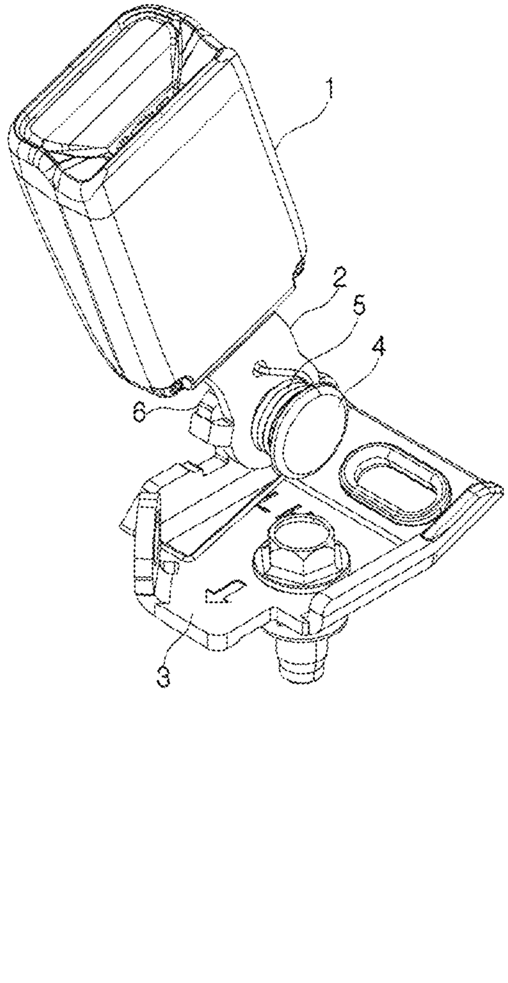
PRIOR ART FIG. 1
FIG. 1 is a perspective view of a related-art seat belt buckle device.
Figure 2:
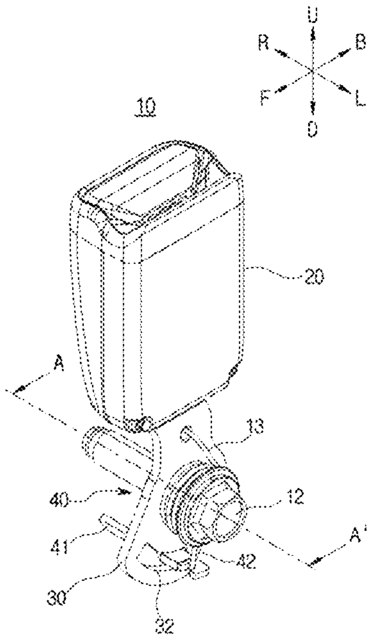
FIG. 2 is a perspective view of a seat belt buckle device according to a preferred embodiment of the disclosure.
Figure 3:
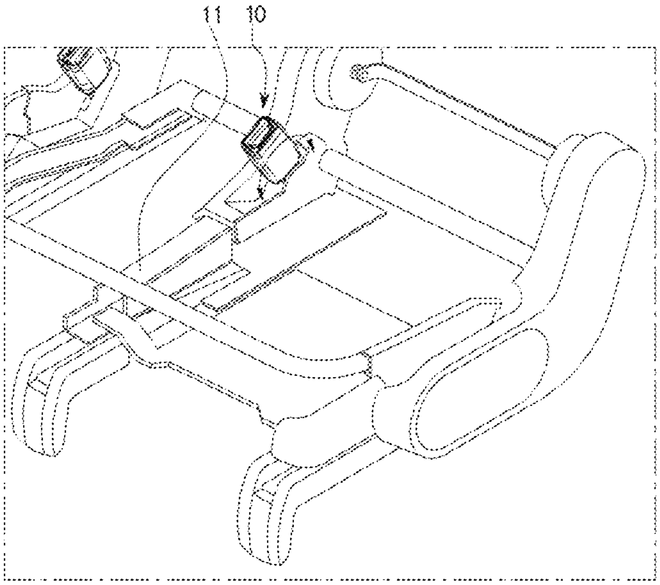
FIG. 3 is a perspective view illustrating a state in which the seat belt buckle device shown in FIG. 2 is installed in a vehicle body.
Figure 4:
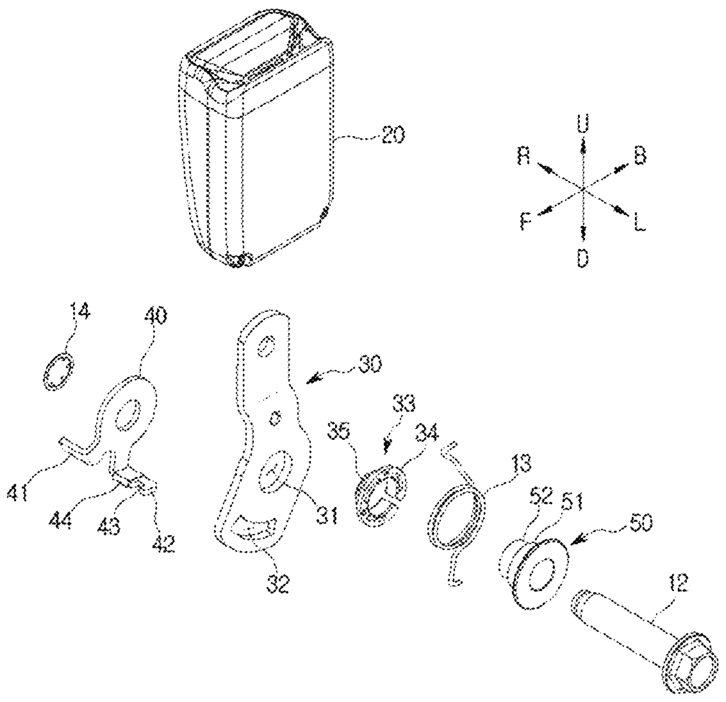
FIG. 4 is an exploded perspective view of the seat belt buckle device shown in FIG. 2.
Figure 5:
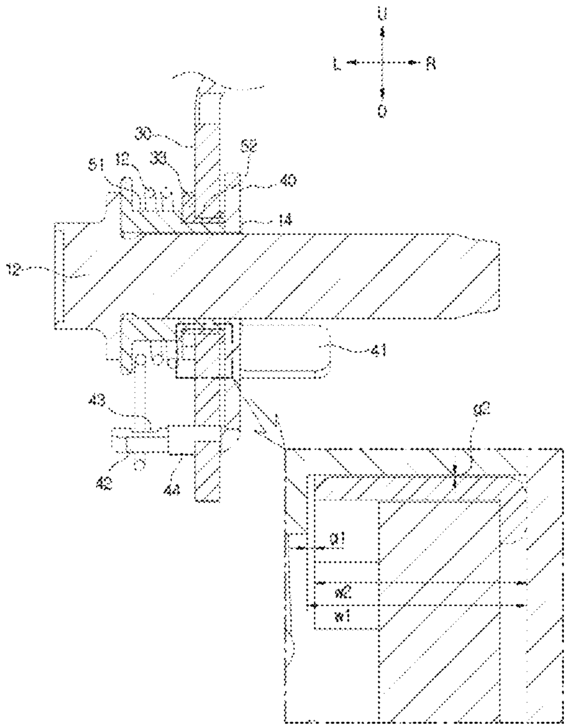
FIG. 5 is a cross-sectional view taken on line A-A' of FIG. 2.

FIG. 2 is a perspective view of a seat belt buckle device according to a preferred embodiment of the disclosure, and FIG. 3 is a perspective view illustrating a state in which the seat belt buckle device shown in FIG. 2 is installed in a vehicle body. In addition, FIG. 4 is an exploded perspective view of the seat belt buckle device shown in FIG. 2, and FIG. 5 is a cross-sectional view taken on line A-A' of FIG. 2.

In the following descriptions, a direction in which a buckle 20 and a strap 30 shown in FIG. 2 are rotated about a mounting bolt 12 by an external force is referred to as a 'forward direction (F)', and a direction in which the buckle 20 and the strap 30 are restored by a torsion spring 13 is referred to as a 'rear direction (R)'. In addition, terms indicating directions such as 'left side (L),' 'right side (R),' 'upward direction (U),' and 'downward direction (D)' are defined to indicate respective directions with reference to the forward direction and the backward direction described above.

In the present embodiment, a configuration of a seat belt buckle device applied to a left rear seat of a vehicle will be described.

Of course, the disclosure is not limited thereto, and it should be noted that the disclosure is applied to a right rear seat by applying a symmetric structure to the seat belt buckle device installed at the left rear seat.

In addition, the disclosure may be applied to a rear middle seat in which a strap and a buckle are connected by a webbing or a cable, a driver seat or a passenger seat.

As shown in FIGS. 2 and 3, the seat belt buckle device 10 according to a preferred embodiment of the disclosure includes the buckle 20 to which a tongue (not shown) is detachably coupled, the strap 30 that is coupled to a lower part of the buckle 20 and mounted at the seat frame 11 to be rotatable in the forward and backward directions, a bracket 40 disposed at one side of the strap 30 to restrict a rotation angle of the strap 30, and a torsion spring 13 that provides a restoring force to allow the strap 30 to be disposed upwards.

That is, as shown in FIG. 3, the seat belt buckle device 10 according to a preferred embodiment of the disclosure may be mounted on one side wall of the seat frame 11 provided on a rear left seat, that is, a right side wall, to be rotatable in the forward and backward directions.

Specifically, as shown in FIGS. 2 to 4, the strap 30 may be formed in a substantially rectangular plate shape that has a length in the vertical direction extended lengthways.

The strap 30 may have a bending portion that is formed on a substantially center thereof and is doubly bent to correspond to arrangement structures of the buckle 20 and the seat frame 11.

Therefore, an upper end of the strap 30 may be coupled to the buckle 20, and a lower end of the strap 30 may be disposed to overlap the right side wall of the seat frame 11.

The strap 30 may be mounted in the seat frame 11 by means of the mounting bolt 12.

To achieve this, the strap 30 may have a penetrating hole 31 penetrating therethrough to allow the mounting bolt 12 to be secured thereto.

In addition, an adjustment hole 32 may be formed on a lower portion of the penetrating hole 30 to allow an adjustment protrusion 42 of a bracket 40, which will be described below, to be inserted thereinto.

That is, with the adjustment protrusion 42 being coupled to the adjustment hole 32, the buckle 20 and the strap 30 may rotate about the mounting bolt 12. The adjustment hole 32 may be formed in an arc shape that is downwardly convex to make the strap 30 rotatable.

Therefore, the rotation angle of the buckle 20 and the strap 30 may be restricted by a length of the adjustment hole 32 in the forward-backward direction. For example, the buckle 20 and the strap 30 may rotate forward by about 20° to 50° in the counter clockwise direction.

The bracket 40 may be fixed to the seat frame 11 to perform a function of restricting the rotation angle of the strap 30.

That is, the bracket 40 may be disposed between the seat frame 11 and the strap 30, and may be mounted in the seat frame 11 by means of the mounting bolt 12.

To achieve this, a coupling hole may be formed on a center of the bracket 40 to allow the mounting bolt 40 to be coupled thereto.

In addition, a coupling protrusion 41 may be bent from one side of the bracket 40 toward the seat frame 11, that is, to the right side, to be coupled to the seat frame 11, and the adjustment protrusion 42 may be bent from a lower end of the bracket 40 toward the strap 30, that is, to the left side.

That is, the adjustment protrusion 42 may include a vertical portion that extends downwards from a lower end of the bracket 40, and a horizontal portion that is bent from a lower end of the vertical portion toward the left side.

The torsion spring 13 may be disposed on the left side of the strap 30, and may provide a restoring force to return the strap 30 rotating forward to an upper portion.

One end of the torsion spring 13, a lower end when viewed on FIG. 4, may be caught in the adjustment protrusion 42 of the bracket 40, and the other end of the torsion spring 13, that is, an upper end, may be caught in the strap 30.

To achieve this, a locking recess 43 may be formed on the adjustment protrusion 42 of the bracket 40 to allow the lower end of the torsion spring 13 to be caught therein, and a locking hole may be formed substantially on a center of the strap 30 to allow the upper end of the torsion spring 13 to be caught therein.

Meanwhile, as shown in FIGS. 4 and 5, a strap bush 33 may be coupled to the penetrating hole 31 of the strap 30, and the mounting bolt 12 may be coupled by passing through a passing hole formed on a center of the strap bush 33 with a bush 50 being coupled to an outer circumference thereof.

A locking member 14 may be coupled to a right end of the mounting bolt 12 to prevent respective components coupled to the mounting bolt 12 from being released. The locking member 14 may be formed in a substantially annular shape, and a plurality of teeth may be formed on an inner circumference of the locking member 14.

The strap bush 33 may be formed in a substantially annular shape having an outer diameter corresponding to an inner diameter of the penetrating hole 31 of the strap 30.

A flange portion 34 may be formed on one side of the strap bush 33, that is, on the left side when viewed on FIG. 5, and a locking projection 35 may be formed on the other side of the strap bush 33, that is, on a right end, to be caught in a periphery of the penetrating hole 31 of the strap 30.

The flange portion 34 may be formed to have an outer diameter larger than the outer diameter of the strap bush.

The locking projection 35 may be formed in a substantially annular shape, or a plurality of locking projections 35 may be formed to be spaced apart from one another by a predetermined angle.

The bush 50 functions to minimize a friction generated during rotation of the strap 30 while being coupled to the torsion spring 13 and the strap bush 33.

The bush 50 may be formed in a substantially cylindrical shape, and a flange portion having a diameter larger than an outer diameter of the bush 50 may be formed on one side of the bush 50, that is, a left end when viewed on FIG. 5.

A first step 51 that is coupled to the torsion spring 13 and supported, and a second step 52 that is coupled to the strap bush 33 may be formed on an outer circumference of the bush 50 in a step-like shape.

That is, the first step 51 may be formed larger than an outer diameter of the second step 52.

Therefore, the first step 51 of the bush 50 is coupled by passing through the center of the torsion spring 13, and the center of the torsion spring 13 may be supported by the first step 51.

Therefore, the second step 52 of the bush 50 may be coupled to the passing hole of the strap bush 33, and the left end of the strap bush 33, that is, the flange portion 34, may be disposed to partially overlap a left side wall of the second step 52.

Herein, a horizontal width w1 of the second step 52 may be slightly larger than a horizontal width w2 of the strap bush 33 (w1>w2).

Therefore, a first gap g1 may be formed between the left side wall of the second step 52 and the flange portion 34 of the strap bush 33, and between the right end of the bush 50 and the left side surface of the bracket 40.

In addition, the outer diameter of the second step 52 may be slightly smaller than the inner diameter of the passing hole formed in the strap bush 33.

Therefore, a second gap g2 may be formed between the outer circumference of the second step 52 and the inner circumference of the passing hole formed in the strap bush 33.

For example, the first gap g1 and the second gap 2 may have a minute size of about 0.1 mm respectively.

In the disclosure described above, the flange portion and the locking projection are formed on both sides of the strap bush, respectively, thereby spacing the strap bush and the bush apart from each other, and the strap bush and the bracket apart from each other.

Accordingly, the disclosure can prevent a damage or a noise caused by a friction generated between the strap bush and the bush and the bracket during rotation of the strap.

When the strap bush 33 and the bush 50 are fabricated by using the same material, for example, a metallic material, a noise may be generated during rotation of the strap 30 and a scratch may be made due to a friction.

To solve this problem, the bush 50 in the present embodiment may be fabricated with a metallic material having stiffness such as a steel material, and the strap bush 33 may be fabricated with a synthetic resin material having low stiffness compared to the bush 50, such as plastic.

According to the disclosure as described above, the width of the second step of the bush may be slightly larger than the width of the strap bush, the outer diameter of the second step may be slightly smaller than the inner diameter of the strap bush, and the bush and the strap bush may be fabricated with different materials, so that a friction generated during rotation of the strap can be minimized and a noise and a scratch can be prevented.

Referring back to FIGS. 4 and 5, a protection member 44 may further be installed on the adjustment protrusion 42 of the bracket 40 to prevent a noise and a scratch made during rotation of the strap 30.

The protection member 44 may be fabricated by using a material like a rubber material or a synthetic resin material.

For example, the protection member 44 may be fabricated in a tubular shape by using a thermal shrinkage rubber material that contracts by heat.

Therefore, as shown in FIG. 4, the protection member 44 may be installed on the horizontal portion that is bent toward the left side on the adjustment protrusion 42, and, when high-temperature heat is applied by using a hot air blower, the protection member 44 may contract and may be securely fixed to the adjustment protrusion 42.

In the disclosure as described above, the projection member is installed on the adjustment protrusion of the bracket to reduce a friction generated during rotation of the strap and to prevent a noise and a scratch.

Meanwhile, when the protection member 44 is installed only on the horizontal portion of the adjustment protrusion 42 as shown in FIG. 4, the projection member 44 may be moved to the outside of the adjustment protrusion 42 or removed by a vibration or an impact.

To solve this problem, the protection member 44 may be extended from the horizontal portion of the adjustment protrusion 42 to the vertical portion.

Figure 6:
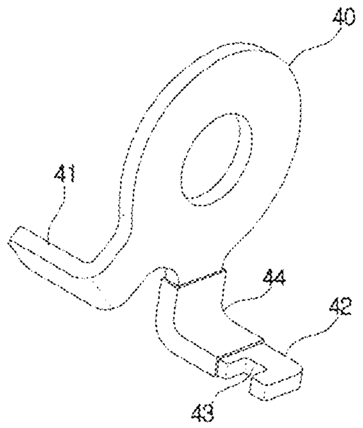
FIG. 6 is a perspective view of a bracket which is applied to a seat belt buckle device according to another embodiment of the disclosure.

FIG. 6 is a perspective view of a bracket applied to a seat belt buckle device according to another embodiment of the disclosure.

As shown in FIG. 6, the protection member 44 may be formed on the whole adjustment protrusion 42 which is bent.

Accordingly, the protection member 44 may be installed in a substantially 'L' shape to correspond to the bent shape of the adjustment protrusion 42.

According to the disclosure as described above, the protection member may be installed on the bent adjustment protrusion so as to correspond to an overall area where the strap and the bracket contact each other during rotation of the strap, so that a noise and a scratch made during rotation of the strap can be prevented.

Hereinafter, a coupling relationship and an operating method of the seat belt buckle device according to a preferred embodiment of the disclosure will be described in detail with reference to FIGS. 7 and 8.

Figure 7:
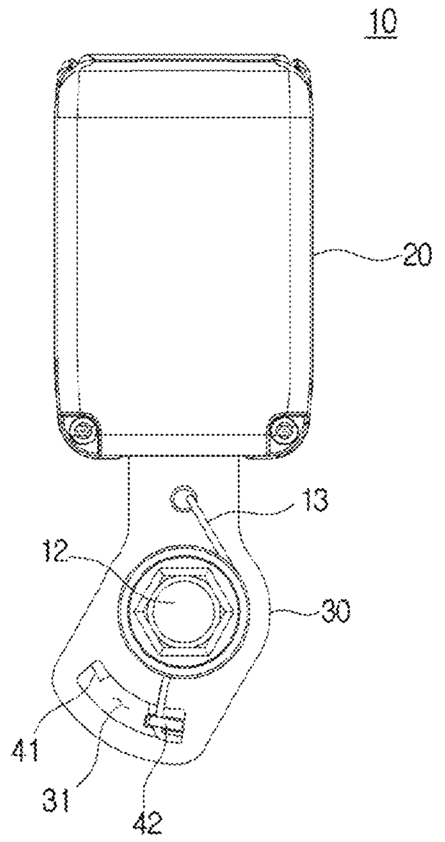
FIGS. 7 and 8 are operational state views to explain an operating method of the seat belt buckle device according to a preferred embodiment of the disclosure.
Figure 8:
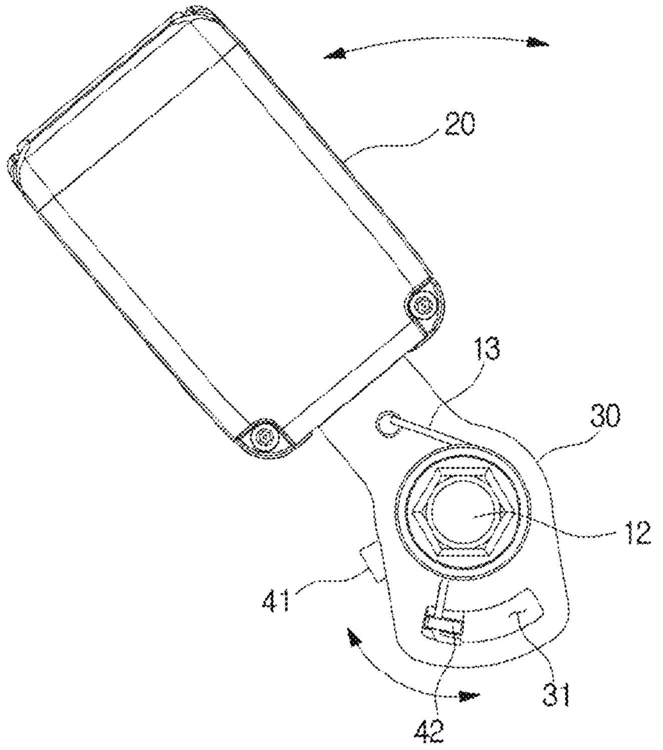

FIGS. 7 and 8 are operational state views to explain an operating method of the seat belt buckle device according to a preferred embodiment of the disclosure.

FIG. 7 illustrates a buckle that is in an upwardly erected state, and FIG. 8 illustrates the buckle that is rotated forward by user's operation, etc.

First, an operator couples the strap 30 to the lower part of the buckle 20. In this case, the strap bush 33 is coupled to the penetrating hole 31 of the strap 30.

In addition, the bracket 40 is placed on one side of the strap 30, that is, the right side, and the torsion spring 13 is placed on the left side of the strap 30, and in this state, the bush 50 and the mounting bolt 12 are coupled by passing through the respective components.

In this case, the adjustment protrusion 42 of the bracket 40 is inserted into the adjustment hole 32 of the strap 30, and both ends of the torsion spring 13 are caught in the locking recess 43 of the adjustment protrusion 42 and the locking hole of the strap 30, respectively.

Consecutively, the respective components are securely fixed by coupling the locking member 14 to the right end of the mounting bolt 12.

The seat belt buckle device 10 assembled through the above-described process is securely fixed to the right side wall of the seat frame 11 provided on the left rear seat by securing the mounting bolt 12.

As described above, the disclosure omits a base bracket that is designed to install a seat belt buckle device at a seat frame in related-art technology, and may directly mount the strap at the seat frame.

Accordingly, the disclosure can enhance workability by reducing the number of components and processes by directly mounting the strap at the seat frame, and can reduce a manufacturing cost.

In this case, the coupling protrusion 41 of the bracket 40 which is bent toward the right side is coupled to the seat frame 11, so that the bracket 40 can be securely fixed to the seat frame 11.

On the other hand, the buckle 20 and the strap 30 may rotate forward about the mounting bolt 12.

That is, normally, the strap 30 may maintain its upright position or slight tilt from the top to the front due to an elastic force of the torsion spring 13 as shown in FIG. 7.

On the other hand, when user's operation is applied to the buckle 20 or an external force is transmitted, the strap 30 may rotate forward about the mounting bolt 12 in the counter clockwise direction as shown in FIG. 8.

Therefore, the user can adjust the angle of the buckle 20 to a desired angle and can easily couple the tongue to the buckle 20 when wearing the seat belt.

When the user's operation or external force is removed, the strap 30 receives a restoring force from the torsion spring 13 and returns to its original upright position.

While the strap is rotating as described above, the protection member installed on the adjustment protrusion of the bracket can prevent a noise and a scratch which are made during the rotation of the strap.

In addition, the bush and the strap bush are fabricated with different materials, and gaps are formed between the bush and the strap bush and between the bush and the bracket, so that a friction generated during the rotation of the strap can be minimized and a noise and a scratch can be prevented.

Through the above-described process, the disclosure can maintain the buckle in the upright position to allow the tongue to be easily coupled to the buckle, and can prevent a noise and a damage caused during the rotation of the strap connected to the buckle.

In addition, the disclosure can enhance workability by reducing the number of components and processes by directly installing the strap at the vehicle frame, and can reduce a manufacturing cost.

Although the invention made by the inventors of the present application has been specifically described according to the above embodiments, the present disclosure is not limited to the above embodiments, and may be modified variously within a scope of the technical essence of the disclosure.

That is, the configuration of the seat belt buckle device applied to the left rear seat of the vehicle has been described, but the disclosure may be applied to the right rear seat by applying a structure symmetrical to the seat belt buckle device installed at the left rear seat.

In addition, the disclosure may be changed to be applied to a rear middle seat in which a strap and a buckle are connected by a webbing or a cable, a driver seat or a passenger seat.

The disclosure is applied to a seat belt buckle device technology that maintains a buckle in an erected state so as to allow a tongue to be easily coupled to a seat belt buckle, and prevents a noise and a damage caused during rotation of a strap connected to the buckle.

The invention claimed is:

1. A seat belt buckle apparatus comprising:
- a buckle to which a tongue is detachably coupled;
- a strap coupled to a lower portion of the buckle and rotatably mounted to a seat frame to rotate in a forward and backward direction;
- a bracket disposed on one side of the strap and fixed to the seat frame to limit a rotation angle of the strap; and
- a torsion spring providing a restoring force such that the strap is positioned upward,
- wherein the strap is formed with a through hole into which a mounting bolt is coupled to the seat frame is fastened, and an adjustment hole into which an adjustment protrusion is formed in the bracket is inserted,
- wherein a strap bush is coupled to the through hole,
- wherein the mounting bolt is coupled to a through hole of the strap bush in a state in which the torsion spring and a bush are installed on an outer peripheral surface of the mounting bolt,
- wherein the bush is formed on an outer peripheral surface thereof with a first step and a second step, which are configured to have a stepped surface, in which the torsion spring is coupled to the first step and supported thereon, and the strap bush is coupled to the second step of the bush, and
- wherein the second step of the bush is configured to have a width wider than that of the strap bush such that the bush is spaced apart from the strap bush and a first gap is defined as a width difference between the second step of the bush and the strap bush, and an outer diameter of the second step is configured to be smaller than an inner diameter of the strap bush such that a second gap is defined as a diameter difference between the outer diameter of the second step and the inner diameter of the strap bush.

2. The seat belt apparatus of claim 1, wherein the first gap is formed between a left side wall of the second step and a flange portion of the strap bush, and between a right end of the bush and a left side surface of a flange.

3. The seat belt apparatus of claim 1, wherein the second gap is formed between an outer circumference of the second step and an inner circumference of the through hole formed in the strap bush.

4. The seat belt apparatus of claim 1, wherein each of the first gap and the second gap has a size of around 0.1 mm.

5. A seat belt buckle apparatus comprising:

a buckle to which a tongue is detachably coupled;

a strap coupled to a lower portion of the buckle and rotatably mounted to a seat frame to rotate in a forward and backward direction;

a bracket disposed on one side of the strap and fixed to the seat frame to limit a rotation angle of the strap; and a torsion spring providing a restoring force such that the strap is positioned upward, wherein the strap is formed with a through hole into which a mounting bolt is coupled to the seat frame is fastened, and an adjustment hole into which an adjustment protrusion is formed in the bracket is inserted, wherein the adjustment protrusion is configured to be bent toward the strap at a lower end of the bracket, wherein the adjustment protrusion is provided with a protective member that covers the adjustment protrusion and is configured to be bent in order to prevent noise and scratch by covering an entire contact area between the strap and the bracket when the strap is rotated, wherein a strap bush is coupled to the through hole, wherein the mounting bolt is coupled to the through hole of the strap in a state in which the torsion spring and a bush are installed on an outer peripheral surface of the mounting bolt, wherein the bush is formed on an outer peripheral surface thereof with a first step and a second step, which are configured to have a stepped surface, in which the torsion A spring is coupled to the first step and supported thereon, and the strap bush is coupled to the second step of the bush, the bush and the strap bush are manufactured by using mutually different materials to prevent noise and damage generated during rotation of the strap.

6. The seat belt apparatus of claim 5, wherein the rotation angle of the strap is limited by a length of the adjustment hole in a forward and backward direction.

7. The seat belt apparatus of claim 5, wherein the protective member is manufactured in a tube shape by using a heat-shrinkable rubber material, and fixed to the adjustment protrusion while being shrunk by heat in a state in which the protective member is installed on the adjustment protrusion.

8. The seat belt apparatus of claim 5, wherein the bush is formed of a metal material having rigidity, and the strap bush is manufactured by using a synthetic resin material having rigidity lower than that of the bush.

* * * * *